United States Patent [19]

Shibata et al.

[11] Patent Number: 5,284,508
[45] Date of Patent: Feb. 8, 1994

[54] COATING COMPOSITION FOR GLASS CONTAINERS

[75] Inventors: Masatoshi Shibata, Yokohama; Teruto Isonage, Kashiwa; Eiji Kamiryo, Nabari; Kiyoshi Shinohara, Hirakata, all of Japan

[73] Assignees: Kirin Brewery Company Ltd.; Riken Vitamin Co., Ltd., both of Tokyo, Japan

[21] Appl. No.: 723,979

[22] Filed: Jul. 1, 1991

[30] Foreign Application Priority Data

Jul. 5, 1990 [JP] Japan ............................... 2-177826
Jul. 5, 1990 [JP] Japan ............................... 2-177827
Nov. 13, 1990 [JP] Japan ............................... 2-306731

[51] Int. Cl.$^5$ ........................................... C09D 191/00
[52] U.S. Cl. ........................................ 106/267; 106/265
[58] Field of Search ............... 106/243, 244, 252, 265, 106/267, 268

[56] References Cited

U.S. PATENT DOCUMENTS 4,198,243  4/1980  Tanaka ................................. 106/35

FOREIGN PATENT DOCUMENTS 1792455   11/1971  Fed. Rep. of Germany .
57-179053 11/1982  Japan ............................ C03C 17/30
59-145259  8/1984  Japan ............................ C09D 3/387
62-128951  6/1987  Japan ............................ C03C 17/28

OTHER PUBLICATIONS

Database WPIL, Week 7233, AN 72-52045T, & JP-B-47 030 760, "Staining Composition—Containing Fatty Acid, Triglyceride, Hydrocarbon" (no date avail.).
Database WPIL, Week 8433, AN 84-203847, & JP-A-59 116 152, "Coating Composition for Scratched Bottles—Contains Liquid Paraffin and/or Carnáuba Wax Fatty Acid Ester and Morpholine Salt of Fatty Acid" (Jul. 1984).
Database WPIL, Week 8432, AN 84-197603, & JP-A-59 111 947, (Jun. 28, 1984), "Coating Composition for Covering Scratches on Bottles—Contains Liquid Paraffin and/or Carnuba Wax and Fatty Acid Ester(s)".
Chemical Abstracts, vol. 101, No. 20, (Nov. 12, 1984), p. 184, A. Kishimoto, "Lubricants for Deep-Drawing in Manufacture of Metal Containers for Beverages", 101:1774422h.
World Patent Index, 79-86988B, & JP-A-54-137020, (Oct. 10, 1979).
Patent Abstracts of Japan, vol. 8, No. 273, (C-256), (Dec. 13, 1984), & JP-A-59-145259, (Aug. 20, 1984).
I. Seiichirou, et al., "Scratch Coating Composition for Bottle".

*Primary Examiner*—David Brunsman
*Attorney, Agent, or Firm*—Oblon, Spivak, McClelland, Maier & Neustadt

[57] ABSTRACT

A coating composition for glass containers containing medium chain fatty acid triglyceride, medium chain fatty acid triglyceride and/or long chain unsaturated triglyceride and squalane, or (a) at least one selected ironi medium chain fatty acid triglyceride, long chain unsaturated triglyceride and liquid paraffin and (b) fatty acid isopropyl as essential ingredient(s).

2 Claims, No Drawings

COATING COMPOSITION FOR GLASS CONTAINERS

BACKGROUND OF THE INVENTION

The present invention relates to a coating composition for glass containers, which is coated onto the outer surface upon recycling glass containers for beer, juice, mineral water, etc. to enhance the appearance as well as masking scratches.

The glass containers for beer, juice, mineral water, etc. are repeatedly used by a collection system. When repeatedly using these bottles, scratches can generate on the outer surface due to mutual rubbing of bottles in the filling and distribution process to injure the appearance and to decrease the commercial value of bottled beverages. Upon recycling, therefore, it is necessary to coat a coating agent onto the portion of scratches, thus masking the scratches inconspicuous and enhancing the appearance at the same time. The portions of bottles violently generating the scratches are approximately fixed; for example, in the case of common beer bottles in Japan, the generation of scratches are violent at the positions of 1 to 2 cm, 5 to 7 cm and 13 to 15 cm from the bottom. For this reason and other various conditions, partial coating such as two or three-stripe coating or the like, wherein the coating liquor is applied only onto the portions of violent scratches, is generally carried out. However, the scratches sometimes generate at positions other than those fixed positions, thus improvement in the working process is required for beautifully finishing even such portions.

In order to cope with such problems, some coating compositions for the scratches of glass containers have so far been proposed. For example, in Japanese Unexamined Patent Publication No. Sho 57-179053, a composition using dimethylpolysiloxane together with aminomethylpoly,,3iloxane is disclosed. Also, in Japanese Unexamined Patent Publication No. Sho 59-145259, a composition having liquid paraffin as a major ingredient and using small amounts of higher alcohol fatty acid ester and polyhydric alcohol fatty acid ester in combination is disclosed. Furthermore, in Japanese Unexamined Patent Publication No. Sho 62-128951, a composition containing acetylated glycerine fatty acid ester as an essential ingredient has also been disclosed. While these are favorable compositions for said partial coating processes, they are unsuitable in several points when considering overall coating process by the shower or spray method of coating liquor or with sponge aiming at the improvement in the partial coating process and the beautiful finishing of overall bottle surface. If considering the coating liquor for overall coating, such matters that it dries rapidly, that it does not allow slippage where handled, that it does not adversely affect the label (exudation and easy stripping off) and that it allows good transportability (no rubbing in the printed area of label) are desired in addition to the performance desirable for the coating liquor by the conventional system (masking property, appearance, non-tackiness, writer resistance and washing property).

The purpose of the invention is to provide a coating composition for glass containers having solved said problems.

As a result of diligent investigations for obtaining a coating composition for glass containers having solved said problems, the inventors have reached the invention.

SUMMARY OF THE INVENTION

It has been found that (1) a composition having medium chain fatty acid triglyceride as an essential ingredient, (2) a composition having medium chain fatty acid triglyceride and/or long chain unsaturated triglyceride and squalane as essential ingredients, (3) a composition having (a) at least one selected from medium chain fatty acid triglyceride, long chain unsaturated triglyceride and liquid paraffin and (b) fatty acid isopropyl as essential ingredients, and (4) the composition, the formulation ratio (by weight) of a/b under (3) aforementioned being 20/80 to 90/10 can solve said problems, leading to successfully coat bottle utilizable in industry.

DETAILED DESCRIPTION OF THE INVENTION

The medium chain fatty acid triglyceride (hereinafter abbreviated as MCT) to be used in the invention can be obtained by completely esterifying three hydroxyl groups of glycerine with 3 moles of medium chain fatty acid. The medium chain fatty acid includes saturated fatty acids with carbons of 8 to 12, concretely caprylic acid, capric acid and lauric acid. These fatty acids can be used solely or as mixtures.

The long chain unsaturated triglyceride to be used in the invention includes triglycerides comprising solely or mixed long chain unsaturated fatty acids, i.e. palmitoleic acid, oleic acid, elaidic acid, linolic acid and linolenic acid, or mixtures of these unsaturated fatty acids partially mixed with long chain saturated fatty acids (palmi-tic acid, stearic acid, etc.). As concrete examples, soybean oil, rape seed oil, olive oil, etc. may be mentioned, but the invention is not confined to these.

The squalane to be used in the invention is a saturated hydrocarbon obtainable through the reduction of hydrocarbon obtained from the liver oil of dogfish and other sharks living mainly in ocean depths, which coincides with the Japanese Standard of Cosmetic Ingredients.

The liquid paraffin to be used in the invention is a mixture of liquid hydrocarbons obtained from petroleum, which coincides with the Japanese Standard of Cosmetic Ingredients.

The fatty acid isopropyl to be used in the invention is fatty acid esters of isopropyl alcohol obtainable by reacting fatty acids derived from natural oils and fats, e.g. lauric acid, myristic acid, palmitic acid, oleic acid, etc., with isopropyl alcohol.

In the invention, the formulation ratio of ingredient (a) to ingredient (b) under (4) aforementioned is also important. If the formulation ratio of (a)/(b) is within a range of 0/100 to 20/80, some of the masking properties, appearance, water resistance and transportability would be insufficient in the coating performance required and, if the formulation ratio of (a)/(b) is within a range of 90/10 to 100/0, non-tackiness, washing properties, drying properties and slip-down properties would be insufficient. Hence, in order to satisfy all of these performance, it is necessary for the formulation ratio of (a)/(b) to be within a range of 20/80 to 90/10.

The composition of the invention is used by emulsifying one or not less than two kinds of said ingredients into water. As the surfactant to be used as emulsified into water, the use of at least two kinds selected from nonionic surfactants including sorbitan fatty acid ester, polyoxyethylene sorbitan fatty acid ester, glycerine fatty acid ester, polyoxyethylene glycerine fatty acid ester, polyglycerine fatty acid ester, sucrose fatty acid ester, polyoxyethylene nonylphenyl ether, polyoxyethylene alkyl ether, etc. is desirable, but the invention is not confined to these.

The compositions of the invention are as under (1) through (4) aforementioned, but, as in (1) and (2), besides the essential ingredient(s), the combined use of small amount of, for example, dimethylsilicone oil and liquid paraffin being commonly used ingredients of coating agents for bottle does not hinder the invention.

Moreover, in the compositions of (3) and (4), besides the essential ingredients, the combined use of small amount of, for example dimethylsilicone oil being a commonly used ingredient of coating agents for bottle does not hinder the invention.

EXAMPLE 1

(1) Coating method

Coating compositions as shown in Table 1 were converted to 10% emulsion with homogenizer. Into each of these solutions, a beer bottle with scratches after washing (dipping treatment into 2% aqueous solution of NAOH for 10 minutes at 70° C., then washing and drying) was momentarily dipped at room temperature and thereafter it was allowed to stand for a day in an airy place to give the coating.

(2) Evaluation method

1) Masking property of scratched portions

Comparative judgment was made using a coated article with dimethylsilicone and a coated article with emulsified liquid paraffin as references.

2) Appearance of unscratched smooth surface

The coated state of clean smooth surface without scratches was observed.

3) Extensibility

What state the coating agent stayed in on the smooth glass surface was evaluated.

4) Tackiness and slip property

The tackiness and slip property when in the coated state were evaluated by touching with a tip of a finger.

5) Water resistance

After dipping a coated bottle into water for 24 hours at room temperature, it was taken out to evaluate the remaining state of coating agent.

6) Washing property

A coated bottle was treated for 10 minutes at 70° C. with 2% aqueous solution of NAOH to observe the degree of washout of coating agent of the coated bottle.

7) Transportability

Coated bottles after labeling were placed in a plastic container, and subjected to the vibration test according to JIS Z0232 where the transportability (degree of rubbing of labels) has observed.

(3) Expression of evaluation

TABLE 1

| | Coating composition | | | | | | | | |
|---|---|---|---|---|---|---|---|---|---|
| | Composition (% by weight) | | | | | | | | |
| | MCT* | | | | Emulsifier** | | Others | | |
| | No. 1 | No. 2 | No. 3 | No. 4 | A | B | Liquid paraffin | Dimethyl-Silicone oil | Soybean oil |
| Inventive Article 1 | 90 | | | | 8 | 2 | | | |
| Inventive Article 2 | | 90 | | | 8 | 2 | | | |
| Inventive Article 3 | | | 90 | | 8 | 2 | | | |
| Inventive Article 4 | 70 | | | | 8 | 2 | 20 | | |
| Inventive Article 4 | 70 | | | | 8 | 2 | 20 | | |
| Inventive Article 5 | | | | 70 | 8 | 2 | | 20 | |
| Inventive Article 6 | | | | 70 | 8 | 2 | | | 20 |
| Comparative Article 1 | Silicone oil emulsion (TSM 6341/water = 25/75) | | | | | | | | |
| Comparative Article 2 | Liquid paraffin/Tween 80/lauryl stearate/oleic acid monoglyceride/water = 7.6/1.2/0.8/0.4/90 | | | | | | | | |

◎ Superior
○ Excellent.
△ Poor.
X Very poor
*MCT is as follows:
No. 1 Triglyceride of 100% caprylic acid
No. 2 Triglyceride of 100% capric acid
No. 3 Triglyceride of caprylic acid/capric acid = 60/40%
No. 4 Triglyceride of caprylic acid/capric acid/lauric acid = 60/30/10%
**Emulsifier is as follows:
A: Sorbitan oleate
B: Sucrose oleic acid ester

EFFECT OF THE INVENTION

Evaluations on the performance, safety and price of coating agents of the Inventive Articles 1 through 6 and the Comparative Articles 1 and 2 are shown in Table 2.

TABLE 2

Results of coating compositions

| | Masking property | Appearance | Extensibility | Tackiness and slip property | Water resistance | Washing property | Transport-ability | Safety | Price |
|---|---|---|---|---|---|---|---|---|---|
| Inventive Article 1 | ◎ | ○ | ◎ | ○ | ○ | ◎ | ◎ | ◎ | ○ |
| Inventive Article 2 | ◎ | ○ | ◎ | ○ | ○ | ◎ | ◎ | ◎ | ○ |
| Inventive Article 3 | ◎ | ○ | ◎ | ○ | ○ | ◎ | ◎ | ◎ | ○ |
| Inventive Article 4 | ◎ | ○ | ◎ | ○ | ○ | ○ | ○ | ○ | ◎~○ |
| Inventive Article 5 | ◎ | ○ | ◎ | ◎ | ○ | ○ | ◎ | ○ | ○~△ |
| Inventive Article 6 | ◎ | ○ | ◎ | ○ | ◎ | ◎ | ◎ | ◎ | ◎~○ |
| Comparative Article 1 | △ | ○ | ◎ | ◎ | △ | ○ | ○ | △ | X |
| Comparative Article 2 | ◎ | △ | ○ | △ | ○ | X | △ | △ | ◎ |

As shown in this table, the Comparative Article 1 was inferior in the points of masking property, water resistance, safety and price and the Comparative Article 2 was inferior in the points of tackiness and slip property, washing property, transportability and s fety, whereas the Inventive Articles 1 through 6 exhibited the results above the level in all items showing the progressiveness.

EXAMPLE 2

Coating method

Coating compositions as shown in Table 3 were converted to 10% emulsion with a homogenizer. Into each of these solutions, a beer bottle with scratches after washing (dipping into 2% aqueous solution of NAOH for 10 minutes at 70° C., then washing and drying) was momentarily dipped at room temperature and thereafter was dried for 24 hours at 35° C. in a ventilated place.

Evaluation method

1) Masking property of scratched portions

Comparative judgment was made using Comparative Articles 3 through 7 in Table 3 as references.

2) Tackiness

The coated surface was evaluated by touching with the tip of a finger

3) Drying property

The drying state was evaluated after a beer bottle was treated with coating liquor for 30 minutes at 35° C. in ventilated environment.

4) Slip-down property of coated bottle

A beer bottle coated by the method as mentioned above was filled up with water and the degree of slip-down of bottle from hand when lightly seized by the trunk portion of the bottle was evaluated.

Besides, the appearance of the unscratched smooth surfaces, extensibility, water resistance, washing property, transportability and the expression of evaluation were made similar to Example 1.

TABLE 3

Coating compositions

| | Major ingredient | | | Auxiliary | | | Others | |
|---|---|---|---|---|---|---|---|---|
| | | Triglyceride | | Emulsifier* | | | Liquid | Dimethyl- |
| | Squalane | Caprylate | Olive oil | A | B | C | paraffin | silicone oil |
| Inventive Article 7 | 10 | 80 | | 8 | | 2 | | |
| Inventive Article 8 | 10 | 55 | 20 | | 12 | 3 | | |
| Inventive Article 9 | 30 | | 55 | 12 | | 3 | | |
| Inventive Article 10 | 15 | 70 | | 6 | 6 | 3 | | |
| Inventive Article 11 | 20 | 30 | 15 | 6 | 6 | 3 | 20 | |
| Inventive Article 12 | 20 | 30 | 15 | 6 | 6 | 3 | 10 | 10 |
| Inventive Article 13 | 20 | 30 | 15 | 6 | 6 | 3 | | 20 |
| Comparative Article 3 | | | | 6 | 6 | 3 | 85 | |
| Comparative Article 4 | | | | 6 | 6 | 3 | | 85 |
| Comparative Article 5 | 85 | | | 6 | 6 | 3 | | |
| Comparative Article 6 | | 85 | | 6 | 6 | 3 | | |
| Comparative | | | 85 | 6 | 6 | 3 | | |

TABLE 3-continued

| | Coating compositions | | | | | | | |
|---|---|---|---|---|---|---|---|---|
| | Major ingredient | | | Auxiliary | | | | |
| | | Triglyceride | | Emulsifier* | | | Others | |
| | Squalane | Caprylate | Olive oil | A | B | C | Liquid paraffin | Dimethyl-silicone oil |
| Article 7 | | | | | | | | |

*Emulsifier is as follows:
A: Sorbitan oleate
B: Polyoxyethylene nonylphenyl ether
C: Polyoxyethylene sorbitan oleate

EFFECT OF THE INVENTION

The comparative evaluation of the results of coating compositions of the Inventive Articles 7 through 13 and the Comparative Articles 3 through 7 is shown in Table 4.

of these solutions, a beer bottle with scratches after washing (dipping into 2% aqueous solution of NAOH for 10 minutes at 70° C., then washing and drying) was momentarily dipped at room temperature and thereafter it was dried for 24 hours at 35° C. in a ventilated environment.

TABLE 4

| | Results of coating compositions | | | | | | | | |
|---|---|---|---|---|---|---|---|---|---|
| | Masking property | Appearance | Extensibility | Tackiness | Water resistance | Washing property | Drying property | Slip-down property | Transportability |
| Inventive Article 7 | ○ | ○ | ⊚ | ⊚ | ⊚ | ⊚ | ⊚ | ○ | ⊚ |
| Inventive Article 8 | ⊚ | ○ | ⊚ | ○ | ○ | ⊚ | ○ | ○ | ⊚ |
| Inventive Article 9 | ⊚ | ○ | ⊚ | ○ | ○ | ○ | ○ | ○ | ⊚ |
| Inventive Article 10 | ○ | ○ | ⊚ | ⊚ | ○ | ⊚ | ⊚ | ⊚ | ⊚ |
| Inventive Article 11 | ⊚ | ○ | ○ | ○ | ⊚ | ○ | ○ | ○ | ○ |
| Inventive Article 12 | ⊚ | ○ | ⊚ | ○ | ○ | ○ | ○ | ○ | ○ |
| Inventive Article 13 | ⊚ | ○ | ⊚ | ⊚ | ○ | ⊚ | ⊚ | ○ | ⊚ |
| Comparative Article 3 | ⊚ | ○ | ○ | X | ⊚ | X | X | X | △ |
| Comparative Article 4 | △ | ○ | ⊚ | ⊚ | ○ | △ | △ | ○ | ○ |
| Comparative Article 5 | X | △ | ⊚ | ⊚ | ⊚ | △ | ⊚ | ⊚ | ⊚ |
| Comparative Article 6 | ○ | △ | △ | ○ | △ | ⊚ | △ | ○ | ⊚ |
| Comparative Article 7 | ⊚ | ○ | △ | X | ○ | ⊚ | △ | X | ○ |

As shown in this table, the Comparative Articles 3 through 7 had △ to X for three items or more among eight items of coating performance. Whereas, the Inventive Articles 7 through 13 exhibited the results above the level for all of eight items showing the progressiveness.

EXAMPLE 3

Coating method

Coating compositions as shown in Table 5 were converted to 12% emulsion with a homogenizer. Into each

Evaluation method

Masking property of scratched portions

Comparative judgment was made using Comparative Articles 8 through 16 in Table 5 as references.

Besides, the appearance of unscratched smooth surface, extensibility, tackiness, water resistance, washing property, drying property, slip-down property of coated bottle, transportability and the expression of evaluation were made similar to Example 1 and 2.

TABLE 5

| | Coating compositions | | | | | | | | | | |
|---|---|---|---|---|---|---|---|---|---|---|---|
| | Major ingredient | | | | | | | Auxiliary | | | |
| | Fatty acid isopropyl | | | | Triglyceride | | | Emulsifier*1 | | | |
| | Lauric | Myristic | Palmitic | Oleic | Caprylate | Olive oil | Liquid paraffin | A | B | C | Silicone oil*2 |
| Inventive Article 14 | | 15 | | | 70 | | | 6 | 6 | 3 | |
| Inventive Article 15 | | 30 | | | 55 | | | 6 | 6 | 3 | |
| Inventive Article 16 | | 40 | | | 35 | 10 | | 6 | 6 | 3 | |
| Inventive Article 17 | | 55 | | | | 30 | | 6 | 6 | 3 | |
| Inventive Article 18 | | 65 | | | | | 20 | 6 | 6 | 3 | |
| Inventive Article 19 | | 30 | | | 40 | | 15 | 6 | 6 | 3 | |
| Inventive Article 20 | | 25 | | | 45 | | 7 | 6 | 6 | 3 | 8 |
| Inventive Article 21 | | 20 | | | 50 | | | 6 | 6 | 3 | 15 |
| Inventive Article 22 | 10 | 20 | | | 45 | 10 | | 6 | 6 | 3 | |
| Inventive Article 23 | | 20 | 10 | | 45 | | | 6 | 6 | 3 | 10 |
| Inventive Article 24 | | | | 30 | 45 | | | 6 | 6 | 3 | 10 |
| Inventive Article 25 | | 5 | 20 | 5 | 40 | | | 6 | 6 | 3 | 15 |
| Comparative Article 8 | | | | | | | 85 | 6 | 6 | 3 | |
| Comparative Article 9 | | | | | | | | 6 | 6 | 3 | 85 |
| Comparative Article 10 | | 85 | | | | | | 6 | 6 | 3 | |
| Comparative Article 11 | | | 85 | | | | | 6 | 6 | 3 | |
| Comparative Article 12 | | | | | 85 | | | 6 | 6 | 3 | |
| Comparative Article 13 | | | | | | 85 | | 6 | 6 | 3 | |
| Comparative Article 14 | | 5 | | | 80 | | | 6 | 6 | 3 | |
| Comparative Article 15 | | 5 | | | | | 80 | 6 | 6 | 3 | |

TABLE 5-continued

| | Coating compositions | | | | | | | | | |
|---|---|---|---|---|---|---|---|---|---|---|
| | Major ingredient | | | | | | | Auxiliary | | |
| | Fatty acid isopropyl | | | | Triglyceride | | | Emulsifier*1 | | |
| | Lauric | Myristic | Palmitic | Oleic | Caprylate | Olive oil | Liquid paraffin | A | B | C | Silicone oil*2 |
| Comparative Article 16 | | 75 | | | 10 | | | 6 | 6 | 3 | |

*1 Type of emulsifier
A: Sorbitan Sesquioleate
B: Polyoxyethylene nonylphenyl ether
C: Polyoxyethylene (20) sorbitan oleate
*2 Silicone oil: Toshiba silicone TSF 451-350

EFFECT OF THE INVENTION

The comparative evaluation on the results of coating compositions of the Inventive Articles 14 through 25 and the Comparative Articles 8 through 16 is shown in Table 6.

TABLE 6

| | Results of coating compositions | | | | | | | | |
|---|---|---|---|---|---|---|---|---|---|
| | Masking property | Appearance | Extensibility | Tackiness | Water resistance | Washing property | Drying property | slip-down property | Transportability |
| Inventive Article 14 | ○ | ○ | ○ | ◎ | ○ | ◎ | ◎ | ◎ | ◎ |
| Inventive Article 15 | ○ | ○ | ◎ | ◎ | ○ | ◎ | ◎ | ◎ | ◎ |
| Inventive Article 16 | ○ | ○ | ◎ | ◎ | ○ | ◎ | ◎ | ◎ | ◎ |
| Inventive Article 17 | ◎ | ○ | ◎ | ◎ | ○ | ◎ | ○ | ◎ | ○ |
| Inventive Article 18 | ◎ | ○ | ◎ | ○ | ○ | ○ | ○ | ◎ | ○ |
| Inventive Article 19 | ◎ | ○ | ○ | ○ | ◎ | ○ | ○ | ○ | ○ |
| Inventive Article 20 | ◎ | ○ | ○ | ○ | ◎ | ○ | ○ | ○ | ○ |
| Inventive Article 21 | ○ | ○ | ○ | ◎ | ○ | ○ | ◎ | ◎ | ◎ |
| Inventive Article 22 | ○ | ○ | ○ | ◎ | ○ | ◎ | ◎ | ◎ | ◎ |
| Inventive Article 23 | ○ | ○ | ○ | ◎ | ○ | ◎ | ◎ | ◎ | ◎ |
| Inventive Article 24 | ◎ | ○ | ○ | ○ | ○ | ○ | ○ | ○ | ◎ |
| Inventive Article 25 | ○ | ○ | ○ | ◎ | ○ | ◎ | ◎ | ◎ | ◎ |
| Comparative Article 8 | ○ | △ | △ | X | ◎ | X | X | X | △ |
| Comparative Article 9 | X | △ | ○ | ○ | ○ | △ | △ | △ | ○ |
| Comparative Article 10 | △ | △ | ◎ | ○ | X | ◎ | ◎ | ◎ | ○ |
| Comparative Article 11 | ○ | △ | ○ | △ | △ | ◎ | △ | ○ | △ |
| Comparative Article 12 | ○ | △ | △ | ○ | △ | ◎ | △ | △ | ◎ |
| Comparative Article 13 | ○ | ○ | △ | X | ○ | ◎ | △ | X | ○ |
| Comparative Article 14 | ○ | △ | △ | ○ | △ | ◎ | △ | △ | ◎ |
| Comparative Article 15 | ○ | ○ | ○ | X | ○ | X | X | X | △ |
| Comparative Article 16 | △ | △ | ○ | ○ | △ | ◎ | ◎ | ◎ | △ |

As shown in this table, the Comparative Articles 8 through 16 had △ to X for four items or more among nine items of coating performance. Whereas, the Inventive Articles 14 through 25 exhibited the results above the level for all of nine items showing the progressiveness.

What is claimed is:

1. A scratch masking composition for glass containers comprising squalane and at least one member selected from the group consisting of medium chain $C_8$–$C_{12}$ fatty acid triglycerides and long chain $C_{16}$–$C_{22}$ unsaturated fatty acid triglycerides.

2. A scratch masking emulsion comprising the scratch masking composition in accordance with claim 1 and a surfactant.

* * * * *